United States Patent [19]

George

[11] 3,986,776

[45] Oct. 19, 1976

[54] AUTOMATIC BASELINE COMPENSATOR FOR OPTICAL ABSORPTION SPECTROSCOPY

[75] Inventor: Kenyon Palmer George, Los Altos, Calif.

[73] Assignee: Varian Associates, Palo Alto, Calif.

[22] Filed: Sept. 29, 1975

[21] Appl. No.: 617,926

[52] U.S. Cl. .................................. 356/88; 226/146; 235/151.3; 356/93; 356/96; 356/97
[51] Int. Cl.² ........................................... G01J 3/42
[58] Field of Search .............................. 356/88–98; 235/151.3

[56] References Cited
UNITED STATES PATENTS

| | | | |
|---|---|---|---|
| 3,646,331 | 2/1972 | Lord | 356/96 |
| 3,734,621 | 5/1973 | Moody et al. | 356/97 |

*Primary Examiner*—Vincent P. McGraw
*Attorney, Agent, or Firm*—Stanley Z. Cole; Gerald M. Fisher; John J. Morrissey

[57] ABSTRACT

Apparatus and method are disclosed enabling automatic baseline compensation in a dual beam spectrophotometer. The wavelength adjustment mechanism of the instrument monochromator, is driven in stepwise fashion by a stepping motor or the like, which also drives the tape advance means of a magnetic tape recorder, whereby the tape is advanced past a read/write head in incremental steps with the advance of the wavelength adjustment mechanism. During a calibration run an error signal is generated, which signal indicates at each discrete wavelength whether the imbalance between the reference and sample signals is in a first (or "+") direction, or in a second (or "−") direction). The information conveyed by the error signal is written as a single "+" or "−" bit upon the tape during each step-wise movement of same. The signal comprised by the stream of successive bits is also integrated, and applied to an attenuator in the reference or sample signal channel, to reduce the imbalance, thereby flattening the baseline throughout the spectrophotometer range. During the sample run the bit stream is read-out from the tape and applied to the integrator, to adjust the attenuation in the selected channel, as to duplicate the baseline adjustments effected during writing of the bit stream upon the tape.

15 Claims, 10 Drawing Figures

AUTOMATIC BASELINE COMPENSATOR FOR OPTICAL ABSORPTION SPECTROSCOPY

BACKGROUND OF INVENTION

This invention relates generally to optical absorption spectroscopy, and more specifically relates to spectrophotometers operating in a dual beam mode.

In optical absorption spectroscopy, it is common practice to operate in a dual beam mode, and several well-known techniques may be utilized to achieve such operation. In one such method, e.g., the optical-wavelength energy exiting the instrument monochromator, is processed by a beam splitter, which directs approximately one-half of the light down a "sample" path, and simultaneously directs approximately the other half of the light down the second, or "reference" path. The samples to be studied, which may comprise gas, liquid or a solid, are placed in one or boths beams, in such a manner that the incident energy is either transmitted, reflected, or scattered by the sample. The beams are then caused to fall on two separate photodetectors, one for the sample beam, and one for the reference beam.

In a second method of dual beam operation, the light exiting the monochromator is directed alternately down the sample and reference path, by means of moveable and stationary optical elements. After contacting the sample, the beams are caused to fall on a single photodetector.

In a third method of dual beam operation, the sample and reference materials are moved alternately into a stationary beam which exits the monochromator. The modified beam is then caused to fall on a single photodetector.

In all of the above methods the light can be measured continuously by the photodetector, or the light can be "chopped." By the latter is meant that the beam may be periodically interrupted by an opaque or semi-opaque mask. In the second and third methods mentioned, the photodetector and the source of light are obviously interchangeable.

Regardless of which of the several above methods are employed, the object of dual beam spectroscopy is to produce two separate electrical signals, one of which is proportional to the intensity ($I_o$) of the reference beam, and the other of which is proportional to the intensity ($I$) of the sample beam. It is also common practice to combine these two electrical signals, in such manner that either or both of the following outputs are produced:

$$\text{Percent transmission} = \frac{I}{I_o} \times 100; \quad (1)$$

or $$\text{Absorbance} = \log_{10} \frac{I_o}{I} \quad (2)$$

In utilizing dual beam spectrophotometers it is desirable to obtain an output of 100 percent transmission, or zero absorbance (corresponding to equal signals in each electrical channel) under various conditions, such as when there is no sample in either beam, when identical samples are in each beam, or under other conditions as may be determined by the user; and at all wavelengths at which the apparatus can be used. Since differences usually exist between the two channels, due to unavoidable optical or electrical differences in the beam paths or signal processing channels, it is necessary to amplify or attenuate the signal in one channel with respect to the other in order to achieve balance. In the past this has commonly been effected by the use of an electrical potentiometer which is coupled to the wavelength adjustment mechanism of the monochromator. The potentiometer has taps at various wavelengths, and these are connected to other manually-adjusted potentiometers. By careful adjustment of these potentiometers, sometimes called "multipots," it is possible to achieve a nearly "flat baseline," or zero absorbance level, throughout the entire range of the monochromator.

Various systems have furthermore, from time to time been proposed, the objective of which is to automate the baseline compensation scheme above mentioned, so as to eliminate the laborious and time-consuming operations inherent in multipot adjustment. In U.S. Pat. No. 3,646,331, for example, the combined reference and sample signals are digitized at selected discrete wavelengths, and a correction factor is calculated for each said discrete wavelength so that the digitized output multiplied by the correction factor will yield a zero absorbance output at each said wavelength. The correction factors are each stored, and when a sample is measured by the instrument, each of the stored factors are synchronously applied to multiply the signal derived from the sample. Similarly, U.S. Pat. No. 3,734,621 sets forth a concept wherein the signal indicative of the transmission characteristics of the spectrophotometer is stored during an initial or calibration run, for use in modifying the signals produced during a sample run, as to compensate for the instrument characteristics.

Notwithstanding the attention that has thus been directed toward automating baseline compensation so as to eliminate the requirement for manual adjustment of multipots, the prior art techniques have, in general, been based upon very complex technology. The net effect of these prior approaches has thus been of introducing high cost and reliability problems into the associated instruments.

In accordance with the foregoing, it may be regarded as an object of the present invention, to provide method and apparatus for dual beam spectroscopy, which automatically enables accurate and dependable baseline compensation, thereby eliminating the need for laborious and time-consuming manual adjustment.

It is a further object of the present invention, to provide method and apparatus for dual beam spectroscopy, which eliminates the need for manual baseline adjustment, and which automatically effects such adjustment without the use of excessively costly or complex techniques or components.

SUMMARY OF INVENTION

Now in accordance with the present invention, the foregoing objects, and others as will become apparent in the course of the ensuing specification, are achieved by driving the wavelength adjusting mechanism of the monochromator portion of a dual beam spectrophotometer, via a stepping motor or the like, which motor also drives the tape advance mechanism of a magnetic tape recorder. The tape is thereby advanced in stepwise fashion with the corresponding incremental advance of the wavelength adjustment mechanism. During the calibration run the reference and sample signals are combined at the ratio electronics, and an error signal is generated, which signal indicates at each discrete wavelength whether the imbalance between reference and sample signal is in a first (or "+") direction, or in a second (or "−") direction. The "+" or "−" information conveyed by the error signal is written as a single "+" or "−" bit upon the tape during each stepwise movement of same. The signal comprised by the stream of successive bits is also integrated, and an analog signal corresponding to the integrated signal is applied to an attenuator in the reference (or sample) signal channel, to reduce the imbalance between reference and sample signals throughout the instrument range. The stream of successive plus or minus pulses may be integrated by applying same to up/down counter, the output of the counter being in turn provided to a digital-to-analog (D/A) converter. The analog output from the said converter is provided to the attenuator, which (assuming the attenuator is in the reference channel) attenuates the reference signal in accordance with cumulative count of the up/down counter.

During a sample run the bit stream is read-out from the tape, and is applied to the aforementioned integrator to adjust the attenuator of the reference channel, to thereby duplicate the baseline adjustments effected during the writing of the bit stream upon the tape. The output from the ratio electronics is also, after suitable processing, applied to read-out means, which may be on the form of display and/or recording elements.

BRIEF DESCRIPTION OF DRAWINGS

The invention is diagrammatically illustrated by way of example, in the drawings appended hereto in which.

DESCRIPTION OF PREFERRED EMBODIMENT

Figure 1:
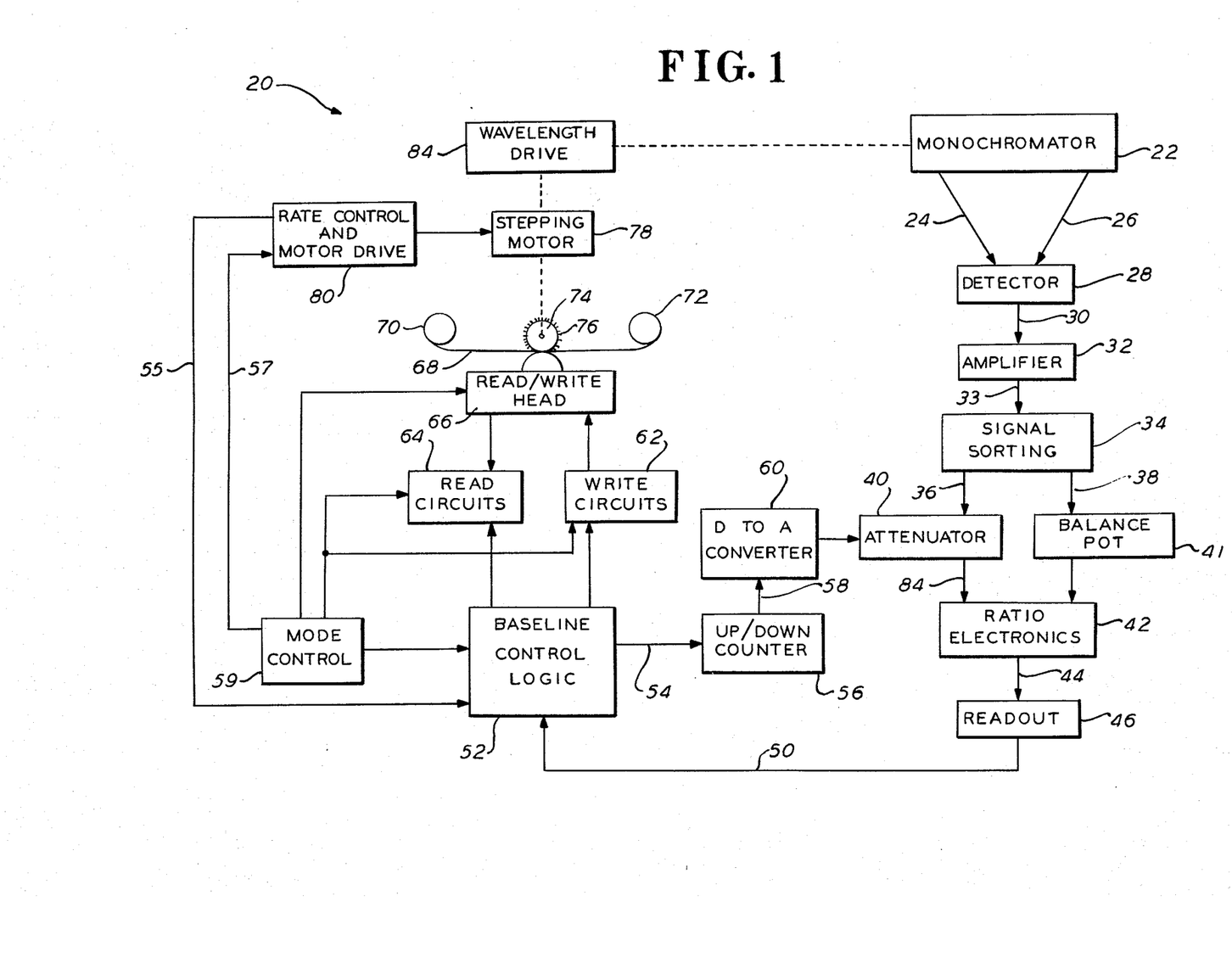
FIG. 1 is an electrical block diagram of a dual beam spectrophotometer incorporating the principles of the present invention.

In FIG. 1 an electrical block diagram is shown, depicting the basic operating principles and component elements of a dual beam spectrophotometer in accordance with the present invention.

The spectrophotometer 20, operates upon the well-known dual beam principle, and accordingly incorporates a conventional monochromator 22, which includes a chopper or other equivalent means for splitting the output from a single light source alternately as a function of time into a reference beam path 24, and a sample beam path 26.

It should, of course, be understood that as used in this specification, the term "light" refers broadly to those portions of the electromagnetic spectrum which are customarily employed in instruments of the present type. Thus, and although not explicitly shown in the Figure, the monochromator 22 may have available at least two light sources, one in the ultra-violet, and the other in the visible and near infrared portions of the electromagnetic spectrum. One or the other of these sources is utilized in accordance with the requirements of the specific use contemplated for the instrument. This aspect of spectrophotometer 20 is conventional, and not per se of the present invention; and accordingly is not set forth in any particular detail herein.

The beams of paths 24 and 26 fall alternately upon a photodetector 28, the output 30 of which is provided to an amplifier 32. Photodetector 28 is of conventional construction; its specific nature is in part a function of the monochromator output. Thus photodetector 28 may e.g., comprise a phototube where the light is predominantly in the U.V. and visible portions of the spectrum. Similarly the photodetector may comprise a lead sulfide cell or other photo conductive detector, where the near infrared portions of the spectrum are being utilized.

The output 33 of amplifier 32, is provided to a signal sorter 34, the function of which is to divert those portions of the signal in line 33 which derive from reference path 24 into the signal processing reference channel 36, and to divert those portions of the signal which relate to path 26 into sample channel 38. In general, the reference signal preceding through reference channel 36 will be proportional to the optical transmission characteristics of reference path 24; and similarly the sample signal preceding through sample channel 38 will be proportional to the transmission characteristics of sample path 26.

In accordance with one aspect of the invention, an attenuator 40 or variable gain means is provided in one or the other of channels 36 or 38, and preferably (as shown) is in the reference channel 36. The objective of such attenuation, as will be further detailed hereinbelow, is to adjust one of the said signals with respect to the other, in order to compensate for differences in the two signals which arise from inherent characteristics of the instrument -- as opposed to differences arising by virtue of the differing transmission of light through the materials to be analyzed.

The signals in the respective channels 36 and 38, are thence provided to a ratio electronics block 42, which combines the respective signals in such fashion as to provide an output at 44 which, depending upon the read-out mode selected, is either proportional to the ratio $$\frac{I}{I_o},$$

or to $$\log_{10} \frac{I_o}{I}.$$

These signals, indicative respectively of transmission or absorbance, may be provided to a read-out block 46 comprising a visual display and/or recording instrument, or so forth. The aspects of the present invention set forth in this paragraph are well-known in the present art, and accordingly are not set forth in any great detail herein.

It will become evident that in general an imbalance will exist between the reference and sample signals of channel 36 and 38; and assuming, for example, that the ratio electronics 42 is providing a signal indicative of absorbance, this signal will accordingly (in general) differ from zero. Except therefore in those very few instances where the reference signal exactly equals the sample signal, the output from ratio electronics 42 will have a somewhat "+" or "−" value. In the present system an "error signal" indicating whether the output is thus "+" or "−" is provided (via line 50) to a baseline control logic block 52. In the arrangement shown in FIG. 1, this error signal is specifically taken from a portion of read-out block 46 such that it is in fact quantized at either of two levels, +V or −V; but it is also possible to take the error signal from line 44 -- where the magnitude of the absorbance may assume various values within the two characterizations of "+" or "−".

Baseline control logic block 52 performs control functions for the scheme now to be set forth, which, in accordance with the invention, enables accurate control of the baseline. In particular, baseline control logic 52 is seen to provide an output via line 54 to an integrator, in the form of an up/down counter 56. This output is a simple positive or negative-going pulse in accordance with the signal provided to logic 52 from line 50. Counter 56 in turn, has its output provided through line 59 to a digital-to-analog converter 60. The output from digital-to-analog converter 60 is, in turn, provided to attenuator 40, previously mentioned.

Baseline control logic 52 is also in two-way communication with the write circuits 62 and read circuits 64 of a magnetic tape recorder -- which includes a read/write head 66. A magnetic recording tape 68 passes between a pair of reels 70 and 72, the advance of tape being controlled by a drive sprocket 74, which is provided with teeth 76 engaging perforated openings along the edge of the tape -- in a manner resembling the driving of movie film. Sprocket 74 is driven in incremental step-wise fashion by a stepping motor 78, by means of a rate control and motor drive 80.

The output from drive 80 is preferably in the form of square wave pulses, in that as is known to those familiar with the art of stepping motors, the latter when so driven, rotate at high velocity from one pole position to the next -- even though the average speed of the motor may be extremely low. This is a significant attribute of the present arrangement in that, as will shortly be evident, step-wise one-bit-at-a-time recording is effected on tape 68 as the latter advances past read/write head 66; and it is necessary -- at least during the read-out operation -- for sufficient velocity to be imparted to the tape during the incremental step-wise movements to enable such operation.

Stepping motor 78 is also seen to be mechanically linked to the wavelength drive mechanism 84, forming part of monochromator 22. The wavelength drive mechanism, as is also known in the present art, basically includes those elements which enable rotation of the prism, diffraction grating or other element, the angular position of which varies the dispersion of incident light so as to enable production of the relatively discrete wavelength of interest. It will be evident that since both the wavelength drive mechanism 84 and the sprocket 74 are driven by the same stepping motor 78, both mechanism 84 and the advancing tape 68 undergo stepwise mechanical advances in synchronism with each other -- which implies that of each step-wise increment in the wavelength output from monochromator 22 a step-wise advance of tape 68 is effected past read/write head 66.

With the aid of the foregoing the basic operations which enable baseline compensation may now be set forth. In particular, during an initial calibration run of spectrophotometer 20, identical samples are placed in each of paths 24 and 26 (or the paths are devoid of either sample or reference objects). In consequence, were the optical and electrical characteristics of the spectrophotometer perfectly balanced, equal signals would proceed through reference channels 36 and sample channel 38. Were such equal signals provided to ratio electronics block 42, it would be evident that an absorbance of O would be indicated at read-out 46. Thus under such hypothetical condition, the absorbance baseline would be flat at zero; and furthermore, were this condition to obtain throughout the wavelength range of the instrument, i.e. as the output from the monochromator were varied throughout its range, the absorbance thus determined would remain at zero throughout -- to produce a completely flat baseline.

As is further known, however, and because of optical and electrical differences that are inherently and unavoidably present in both the optical and electrical paths presented to the dual beams and the ensuing signals, the reference signal is not in general precisely equal to the sample signal, even though identical absorption objects are present in paths 24 and 26. In the present instrument, the objective during the initial calibration run, is thus to store appropriate information on tape 68, as will thereafter enable an appropriate signal to be provided to attenuator 40 to yield a relatively flat baseline during subsequent sample run.

At the initiation of calibration, mode control means 59 is set to enable writing of the correction signal on tape 68. During the calibration run, because of the imbalance indicated, there will be present in line 50 (assuming the signal in line 44 to be indicative of absorbance) either a zero signal indicating zero absorbance, or a "+" or "−" signal, indicating that the signal in the reference channel 36 is less than or exceeds the sample signal in channel 38. This signal is provided to baseline control logic 52, which then provides an output at line 54, in the form already mentioned, of either a positive or negative-going pulse. The up/down counter 56 receiving these "correction" pulses, counts either upwardly or downwardly a single step for each pulse, and thus effectively acts as an integrator. The up/down counter 56 is preferably set initially at an intermediate value appropriate to enable its count to vary about the set point in accordance with the expected number of correction pulses, plus or minus, which would be anticipated to arrive via line 54. In a typical instrument in accordance with the invention, for example, the counter may initially be set at about 4,000 counts. This figure is arrived at by considering the total number of incremental steps of wavelength changes in the monochromator during the course of the instrument running through its entire wavelength range of operation, and the useful degree of absorbancy correction which will be inserted in attenuator 40 by each count change in up/down counter 56.

The output from counter 56 is processed by D to A converter 60, which controls attenuator 40. The net result of these operations is that the presence of an imbalance in the reference and sample signals will result (during each stepped change of the monochromator 20 output) in a single count being added or subtracted from counter 56, which in turn will vary the attenuation in reference channel 36, either increasing or decreasing same in such a direction as to reduce the imbalance between the signals. It will further be evident, however, that since but a single count is added to counter 56 during each incremental change of wavelength, a correction is introduced to attenuator 40 -- but that correction is not usually of sufficient magnitude to result in balancing of the signals. Rather the process is one wherein a stepped change is effected in the attenuation during each cited incremental change of wavelength, so that the imbalance is continually reduced -- but in step-wise fashion.

In addition to providing a signal to counter 56, baseline control logic 52 provides a signal to write circuits 62, in accordance as whether the error signal in line 50 is zero, or in a "+" or "−" condition. In the rare instances where the reference and sample signals are balanced no signal is provided to read/write head 66. But otherwise the read/write head 66 enters a single bit, either at a plus or minus level upon the length of tape 68 which has advanced in step-wise fashion past head 66. In consequence, during the calibration run mentioned, a correction signal comprising a stream of successive, single plus or minus bits, is entered upon tape 66, such bits being entered one-at-a-time in synchronism with each successive incremental step-wise advance of the wavelength drive mechanism 84.

In theory the record provided on tape 68 could be provided on a "clean" or unmagnetized tape, and in principle a "zero" or balanced output condition can be identified. In practice, due to the presence of noise or random fluctuation in the output, only "+" or "−" output signals may be identifiable. In the preferred method of recording, therefore, the recording head is driven from a saturated condition of one polarity to a saturated condition of the other polarity at least once during each motor step. For example, if one polarity is called "+" and the other polarity "−", and if upon interrogation of the electronic output, the output is found to have changed from a "+" to a "−" condition, then during the next the motor step the recording head is driven from a "+" polarity to a "−" polarity. This would subsequently be read as a "−" signal during playback. If, however, the output remained in the "+" condition, then during the next motor step the recording is driven from a "+" polarity to a "−" polarity and then back to a "+" polarity. This would be read as a "+" signal. In this method of recording, it is not necessary to start with a "clean" or unmagnetized tape, since any previous record will be automatically erased. In either method, it is necessary that the recording be effected at a time during a motor step when, upon subsequent playback, the tape will be moving at the highest velocity, in order to obtain maximum signal. In order to enable such result timing information is provided from drive 80 to baseline control logic 52 during the write mode, via the signal channel 55. The latter channel is enabled during the write mode by a signal furnished from control means 59 to drive 80, through line 57. Other recording schemes in addition to that discussed, can be employed, provided that the signals can be read as "+" and "−" during playback.

Following the completion of the calibration run, as is usual, a sample, the absorption or transmission characteristics of which is to be determined, is inserted into sample beam path 26. Mode control means 59 is now set to the read-out mode, and under these conditions the stream of successively recorded plus or minus bits on tape 68 are so read back and processed, as to duplicate the baseline determined during the calibration run.

In particular, each successive incremental change of wavelength is effected via operation of the stepping motor 78 which drives both the wavelength adjusting mechanism 84, and the tape advance sprocket 74. The said bits are accordingly successively read-out during each step of operation by read-write head 66. The correction signal thus proceeds through read circuits 64 and baseline control logic 52, back to the same up/down counter 56 previously mentioned. The latter, once again serves to integrate the successive count provided thereto, and its output in turn (in the precise manner previously set forth) is processed by D to A converter 60 to provide an output which, in accordance with the count registered at counter 56, varies the degree of attenuation provided at attenuator 40. The net result of this operation is, as mentioned, to precisely duplicate the baseline yielded during the calibration run; and the said operation may be effected successively as many times as required during successive sample runs.

Figure 2:
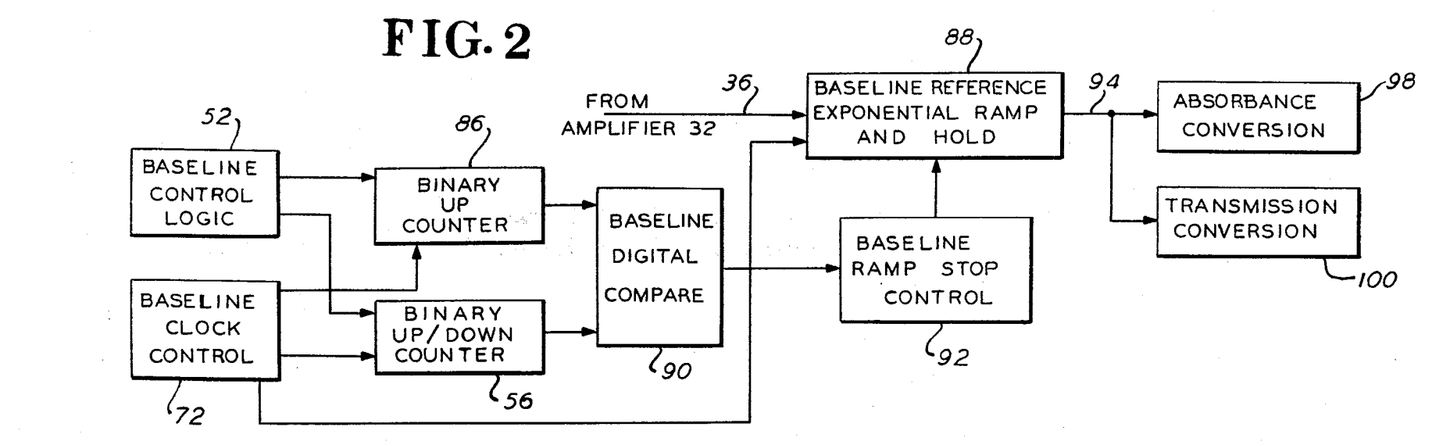
FIG. 2 is an electrical block diagram depicting the operation of the channel attenuator portion of the FIG. 1 system.

FIG. 2 is a block diagram setting forth in greater detail the manner in which D to A converter 60 functions to effect attenuation in reference signal channel 36. It is thus seen in FIG. 2 that in addition to the up/down counter 56 of FIG. 1, a binary up counter 86 is provided. Each of these elements are operating under control of baseline control logic 52, and further receives control inputs from a baseline clock control 72, which ultimately receives clocking pulses from a master clock (not shown). As previously indicated, the up/down counter 56, which is in the nature of a register, is typically set so that a value of 4,000 counts will correspond to a zero absorbance condition at the start of calibration. As will shortly be evident, some degree of attenuation is always present in block 40 (FIG. 1) so that equalization of the signals respectively in channels 36 and 38 is effected at the cited 4,000 counts by a balance potentiometer 41 which is shown in FIG. 1 in sample channel 38.

Figure 3:
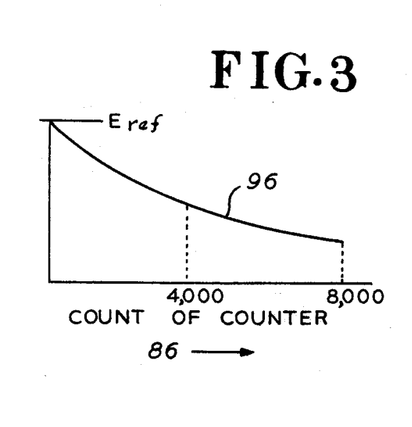
FIG. 3 is a graph setting forth certain aspects of the waveform at the attenuator output.

The signal level from amplifier 32 preceding through reference channel 36, as shown in the wave form diagram of FIG. 3, forms the reference point ($E_{ref}$) for an exponential ramp function 96 which is then developed at baseline reference exponential ramp and hold block 88. At the initiation of the exponential development, binary up counter 86 begins its count (counter 86 and block 88 are each simultaneously initiated by baseline clock control 72), and upon it reaching the setting of up/down counter 56, as determined at baseline digital compare block 90, a signal is provided to baseline ramp stop control 92, which causes the developing exponential function to be held. Thus in FIG. 3 it will be seen that a count of 4,000 approximately corresponds to the midpoint of the exponential curve, the useful range of which runs from about 0 to a count of 8,000. Thus it will be evident that the output from block 88, which is to say the signal at line 94 which proceeds toward the ratio electronics 42 will be determined by the count maintained in up/down counter 56; and further, that the correction which is effected in the reference signal will amount for each step-wise change in wavelength to the change effected in the vertical position of the exponential curve 96 for a single count of counter 56. The ratio electronics 42, previously mentioned, includes circuits well-known in this art for conversion of the combined reference and sample signals to absorbance or to transmission values. This aspect of the invention is indicated at absorbance conversion and transmission conversion blocks 98 and 100.

Figure 4:
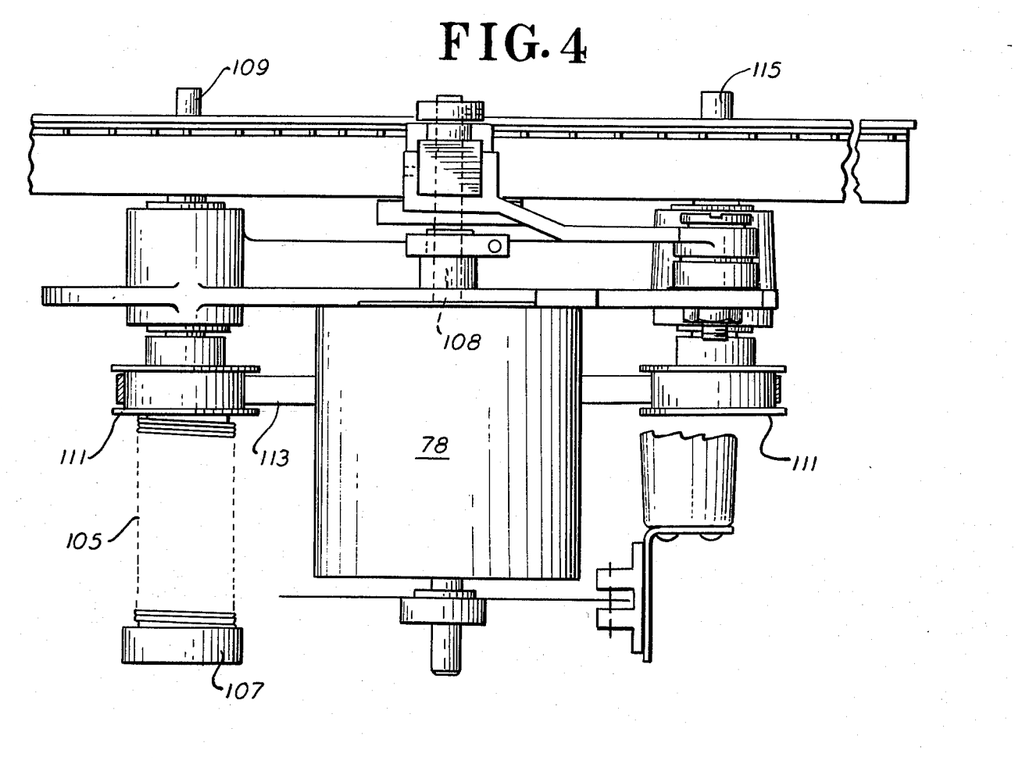
FIG. 4 is an elevational view of the stepping motor, and of portions of the tape recorder driven by said motor.
Figure 5:
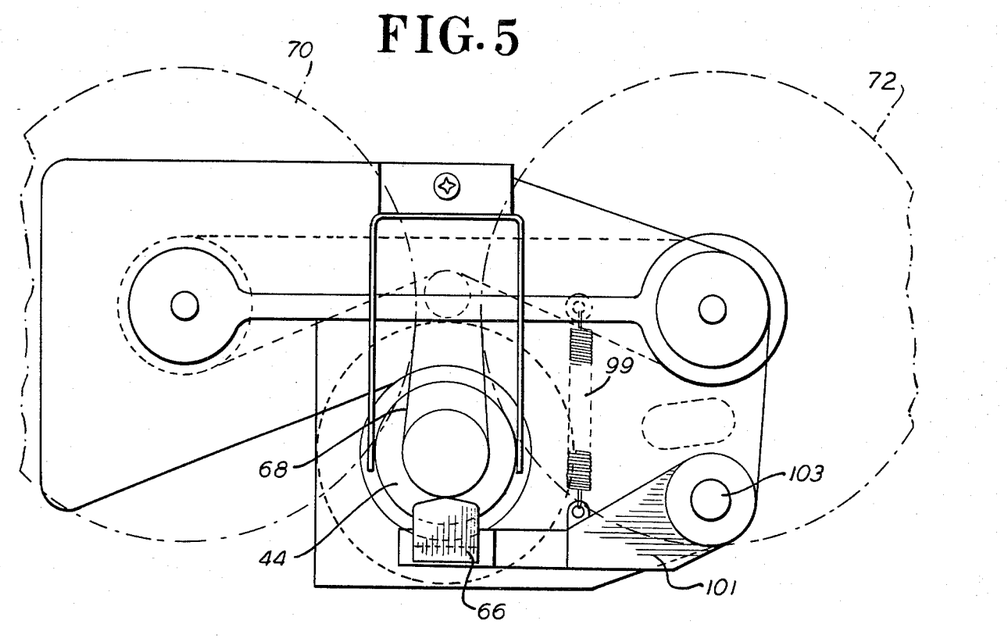
FIG. 5 is a top plan view of the apparatus portions shown in FIG. 4.

In FIGS. 4 and 5, elevational and top plan views are set forth of the stepping motor 78, and of related portions of the tape recording mechanism driven by said motor.

The read/write head 66 is seen to be mounted upon an arm 101, which is pivoted at 103 and is held in contact with the magnetic recording tape 68 by spring 99. Tape 68 is stored on the reels 70 and 72. The tension required to hold tape 68 in contact with sprocket 74 is provided by spring 105, which is coupled to one reel through a collar 107 and a shaft 109, and to the other reel through sprockets 111, toothed belt 113 and shaft 115. Stepping motor 78 is coupled to the wavelength mechanism through the toothed sprocket 106 (FIG. 6).

Figure 7:
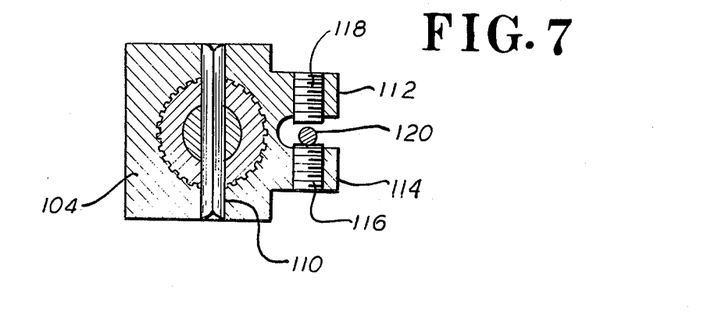
FIG. 7 is a transverse cross-section taken along the line 7—7 of FIG. 6.
Figure 8:
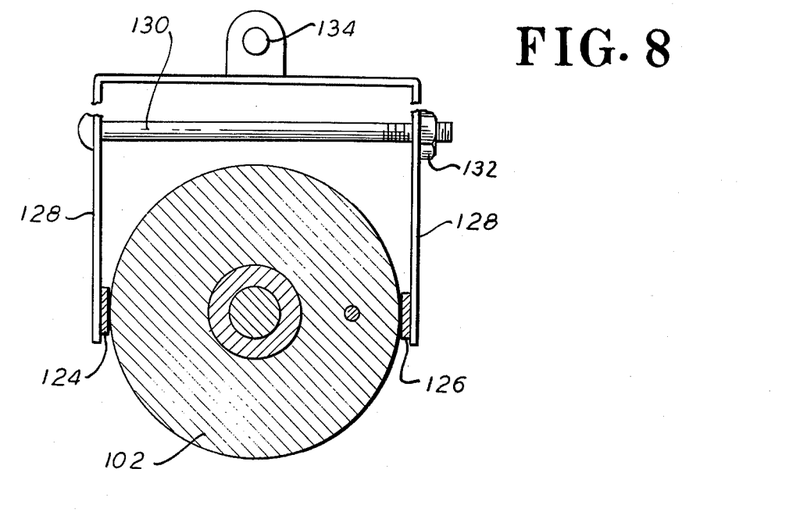
FIG. 8 is a transverse cross-section taken along the line 8—8 of FIG. 6.
Figure 9:
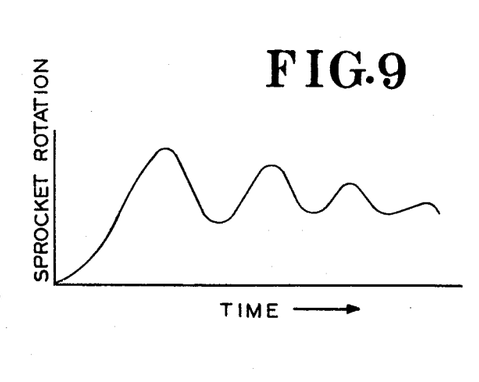
FIG. 9 is a graph of sprocket rotation as a function of of time, and illustrates the oscillation of a sprocket lacking certain of the features incorporated in the invention.

Referring to the graph of FIG. 9, the problem to which the construction in FIGS. 4 through 8 addresses itself will become evident. In particular, it is found in practice, that as stepping motor 78 moves from one pole position to the next, a mechanical oscillation of the type illustrated in FIG. 9 can occur. In this Figure, the rotation of sprocket 74 is graphed as a function of time. Were the condition illustrated in FIG. 9 to obtain, it will be clear that under some conditions the signals recorded on tape 68 could, during the playback, pass across read/write head 66 more than once per motor step, thereby giving rise to spurious signals. It is the objective of the construction shown in the present Figures to eliminate the effects of this oscillatory-type movement.

Figure 6:
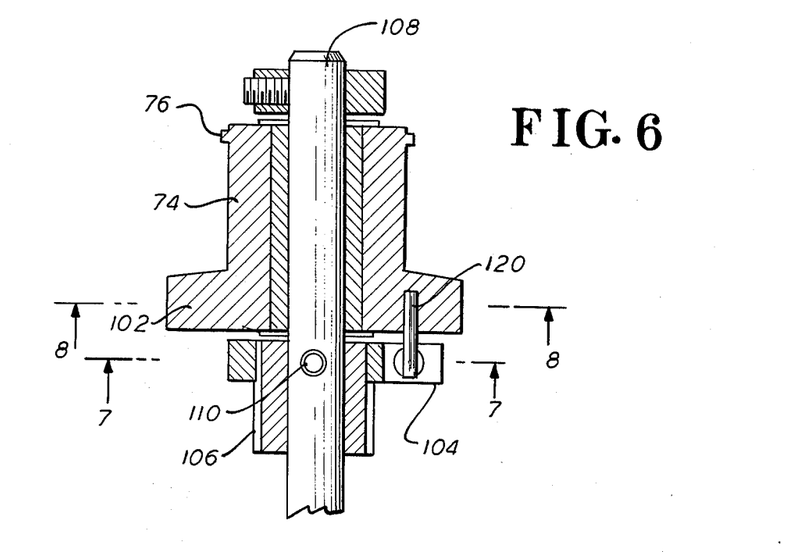
FIG. 6 is a longitudinal cross-sectional view through the tape advance sprocket and associated elements.

Referring to the cross-sectional view of FIG. 6, it will be seen that the sprocket 74 is integral with a brake drum 102. A flange 104 and the wavelength drive sprocket 106 are attached to stepping motor shaft 108 by means of a pin 110. Flange 104 carries a pair of projecting portions 112 and 114, having threaded openings therethrough, into which adjusting screws 116 and 118 are threaded. The opposed ends of the screws 116 and 118 are arranged to contact pin 120.

The screws 116 and 118 are adjusted to permit pin 120 to travel through an arc corresponding to approximately one motor step for contact with one screw to contact with the other. Accordingly each time the motor 78 takes a step, sprocket 74 rotates through a corresponding arc. However, angular oscillations of the motor shaft 108 are not transmitred to sprocket 74. This obtains, firstly, because the sprocket 74 is restrained from reversing direction by a pair of brake shoes 124, 126, which are brought into contact with brake drum 102, by spring members 128. The spring tension is adjusted by threaded fastener 130 and adjusting nut 132. The entire spring and brake shoe assembly is free to pivot about axis 134, thus assuring a uniform braking action even though the drum may be slightly eccentric. Secondly, the spring between pins 116 and 118, and the interaction of pin 120 therewith, provide a determinable (and adjustable) amount of mechanical play between drive shaft 108 and sprocket 74. This mechanical play assures that the slight oscillatory rotations of shaft 108 which occurs after each stepped rotation thereof, are not transmitted to pin 120.

Figure 10:
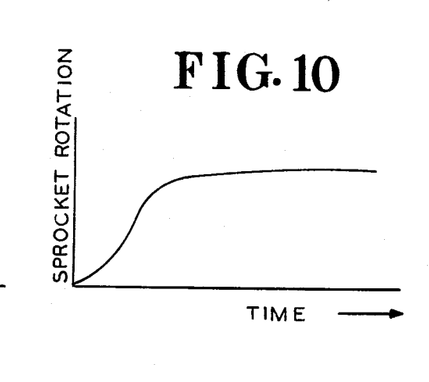
FIG. 10 is a graph similar to FIG. 8, but illustrating the improvement achieved by the construction shown in FIGS. 4 through 8.

In consequence of providing clearance between pin 120 and screws 116 and 118, and by virtue of the action of brake shoes 124 and 126 upon brake drum 102, the sprocket 74 is caused to move through a stepped angular rotation in accordance with the graphical depiction of FIG. 10. In consequence, the signals recorded on the tape can, during playback, pass but once across the pickup head, thereby eliminating spurious signals.

A further advantage achieved by the above arrangement, is that minor adjustment of the screws 116 and 118 can be utilized in order to optimize the phasing between the tape and pickup head, so that the maximum signal output will be obtained in both directions of rotation. In operation, when a baseline correction is recorded (during the calibration mode of operation) starting at a wavelength A and stopping at a wavelength B, a signal is recorded on tape 68 during each step of motor 78. When returning to wavelength A, one recorded signal will be missed because of the clearance between pin 120 and the screws 116, 118. However, during the next playback scan between wavelengths A and B, the error resulting from the lost signal will be corrected after the initial motor step.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

I claim:

1. In a dual beam spectrophotometer of the type including a monochromator and wavelength adjustment means for providing optical outputs from said monochromator at discrete wavelengths; means for providing a reference signal proportional to the intensity of the detected reference beam and a sample signal proportional to the intensity of the detected sample beam; means to combine said reference and sample signals to provide an electrical output indicative of the ratio or $\log_{10}$ of the ratio of said signals, to thereby determine transmission or absorbance of a sample; and compensator means for adjusting the attenuation of at least one of said signals with respect to the other, to thereby establish a relatively flat baseline throughout the wavelength range of said spectrophotometer; the improvement wherein said compensator means comprises:

attenuator means for adjustably attenuating at least one of said reference or sample signals;

wavelength motor means for step-wise driving of said wavelength adjustment means, to provide a series of stepped discrete wavelength outputs from said monochromator;

means for generating during a calibration run through the wavelength range of said spectrophotometer, an error signal indicative at each of the discrete wavelength outputs of said monochromator, of the presence and direction of an imbalance between said reference and sample signals;

magnetic tape recorder means, including tape advance drive means incremently actuated to advance said tape in discrete steps, in synchronism with the incremental step-wise movement provided by said wavelength motor means;

means for writing the information conveyed by said error signal on said tape during each discrete movement of said tape, as a single bit of a first readable level when said error signal indicates said imbalance is in said first direction, and as a single bit of a second readable level when said error signal indicates said imbalance is in said second direction, to enable recording of the information conveyed by said error signal during said calibration run, throughout the wavelength range of said spectrophotometer;

means for integrating the stream of successive said bits and converting the integrated signal to an analog signal for controlling said attenuator means, to reduce, at the beginning of each stepwise change of wavelength, the imbalance of said reference and sample signals, and thereby flatten said baseline; and means for reading out the stream of successive bits on said tape during a sample run upon said spectrophotometer, and applying said read-out bit stream to said integrator to adjust said attenuating means during said sample run, to thereby duplicate the baseline adjustments effected during the writing of said bit stream upon said tape.

2. Apparatus in accordance with claim 1, wherein said wavelength motor means and said magnetic tape recorder means are commonly driven.

3. Apparatus in accordance with claim 2, wherein said wavelength motor means and said tape recorder means are commonly driven by a stepping motor.

4. Apparatus in accordance with claim 3, wherein said stepping motor is energized by a source of square wave power pulses.

5. Apparatus in accordance with claim 1, wherein said bit stream is integrated by an up/down counter, and wherein the count held in said counter is rendered as said analog signal by a digital-to-analog converter.

6. Apparatus in accordance with claim 5, wherein said digital-to-analog converter includes an up-counter, ramp function generator means, means for simultaneously activating said generator and up-counter, means for stopping said function generator and holding the attained level of said function upon said up-counter reading coinciding with the reading of said up/down counter, and means for converting the held level of said function to said signal for said attenuator means.

7. Apparatus in accordance with claim 6, wherein said ramp function is exponential in form.

8. Apparatus in accordance with claim 6, wherein said up/down counter is set at the initiation of said calibration run at a pre-set count; and wherein said bits are of a nominally positive or minus character, whereby said counter counts up or down from said pre-set value in accordance with the positive or negative character of said bits.

9. Apparatus in accordance with claim 8, including balancing potentiometer means for adjusting the level of whichever of said sample and reference signals is not acted upon by said attenuator means, for balancing said sample and reference signals at said pre-set count.

10. Apparatus in accordance with claim 9, wherein said attenuator means acts upon said reference signal.

11. Apparatus in accordance with claim 3, wherein said tape recorder means includes a drive sprocket for advancing said tape; and means for coupling to said sprocket the driven stepped rotational movements of the stepping motor drive shaft, and decoupling from said sprocket the transitory oscillations of said drive shaft upon the termination of each stepped rotation, whereby to render the stepped rotations of said sprocket substantially unidirectional.

12. Apparatus in accordance with claim 11, wherein said coupling and decoupling means includes means positioned in the power train between said drive shaft and sprocket and providing determinable mechanical play therebetween; means frictionally engaging a surface mounted for rigid rotation with said sprocket, for restraining said sprocket at its successive positions of maximum stepped rotation; and said mechanical play being of sufficient magnitude that said transitory oscillations of said drive shaft are within the range of said play, whereby said oscillations are not coupled to said sprocket at its restrained position.

13. Apparatus in accordance with claim 12, wherein said play is adjustable.

14. Apparatus in accordance with claim 12, wherein said coupling and decoupling means includes a flange rigidly affixed about said drive shaft for rotation therewith and coaxial with said sprocket; said flange including a slot transverse to said shaft; and a pin projecting from said sprocket parallel to said shaft, and passing into said slot; rotation of said shaft causing a lateral edge portion of said slot to engage said pin to drive said sprocket; and the spacing of said lateral edges of said slot defining the magnitude of said mechanical play.

15. Apparatus in accordance with claim 14, wherein said slot edges opposed to said pin are defined by the opposed ends of a pair of screws, adjustment of said screws varying the spacing therebetween, to thereby adjust said mechanical play.

* * * * *